United States Patent
Ono et al.

(10) Patent No.: US 7,106,394 B2
(45) Date of Patent: Sep. 12, 2006

(54) BACKLIGHT UNIT IN A LIQUID CRYSTAL DISPLAY DEVICE

(75) Inventors: Shin-Ichirou Ono, Kanagawa (JP); Hirokazu Fukuyoshi, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 20 days.

(21) Appl. No.: 10/807,245

(22) Filed: Mar. 24, 2004

(65) Prior Publication Data
US 2004/0189892 A1 Sep. 30, 2004

(30) Foreign Application Priority Data
Mar. 27, 2003 (JP) .............................. 2003-087871

(51) Int. Cl.
*G02F 1/13* (2006.01)

(52) U.S. Cl. .............................. 349/62; 349/67; 362/33

(58) Field of Classification Search .................. 349/62, 349/67, 58; 362/223, 225, 224, 247, 248, 362/33, 97, 561
See application file for complete search history.

(56) References Cited

U.S. PATENT DOCUMENTS

| | | | | |
|---|---|---|---|---|
| 4,599,684 | A | * | 7/1986 | Lee .............................. 362/346 |
| 5,274,533 | A | * | 12/1993 | Neary et al. .................. 362/225 |
| 5,384,658 | A | * | 1/1995 | Ohtake et al. ............... 359/707 |
| 5,729,311 | A | * | 3/1998 | Broer et al. ................... 349/65 |
| 6,210,019 | B1 | * | 4/2001 | Weathers ..................... 362/220 |
| 6,619,815 | B1 | * | 9/2003 | Southern, Jr. ............... 362/225 |
| 6,709,122 | B1 | * | 3/2004 | Adachi et al. ................ 362/27 |
| 6,923,554 | B1 | * | 8/2005 | Kuo ........................... 362/223 |
| 2002/0044437 | A1 | * | 4/2002 | Lee ............................. 362/31 |
| 2002/0064037 | A1 | | 5/2002 | Lee |
| 2002/0113924 | A1 | | 8/2002 | Saito et al. |
| 2003/0202363 | A1 | * | 10/2003 | Adachi et al. .............. 362/558 |
| 2005/0195619 | A1 | * | 9/2005 | Tseng ......................... 362/561 |

FOREIGN PATENT DOCUMENTS

| | | | |
|---|---|---|---|
| JP | 4-275525 | | 10/1992 |
| JP | 09282921 | A * | 10/1997 |
| JP | 10-39808 | | 2/1998 |
| JP | 2000-338483 | | 12/2000 |
| JP | 2002184231 | A * | 6/2002 |
| JP | 2002-258284 | | 9/2002 |
| JP | 2003257233 | A * | 9/2003 |
| KR | 2002-40989 | | 5/2002 |

* cited by examiner

*Primary Examiner*—James Dudek
(74) *Attorney, Agent, or Firm*—Young & Thompson

(57) ABSTRACT

A double-sided, direct-irradiation type backlight unit has a structure of capable of reducing the luminance irregularity and improve the luminance efficiency. The backlight unit has a scatter-reflection rod member 101 between each adjacent two of elongate lamps. The scatter-reflection rod member 101 has a symmetric shape with respect to the line passing the center thereof in X-direction, and that passing the center thereof in Y-direction. The light emitted from the elongate lamp 102 in X-direction is reflected by the scatter-reflection-rod member 101 and then travels in the direction toward the front- and rear-side diffusion plates 106.

19 Claims, 12 Drawing Sheets

FIG. 10 PRIOR ART
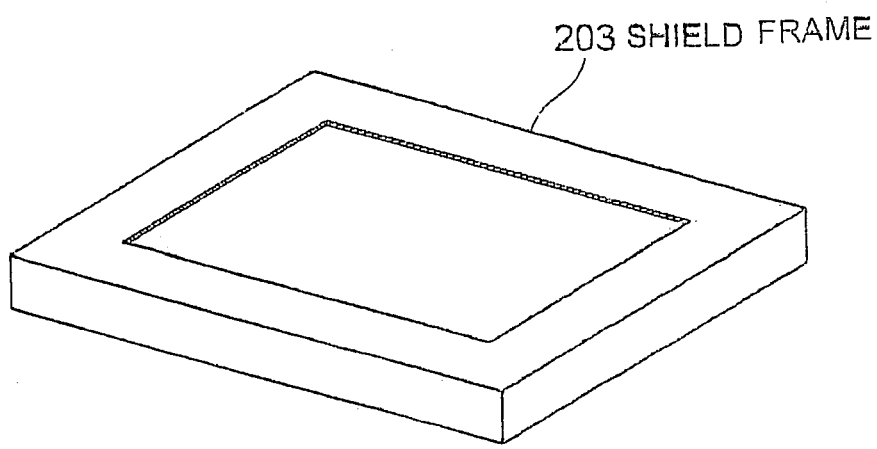
203 SHIELD FRAME
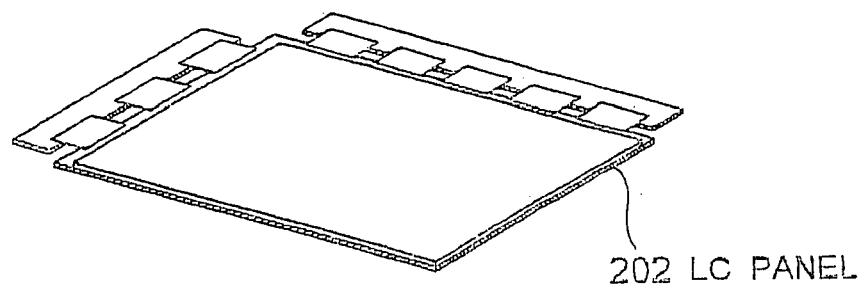
202 LC PANEL
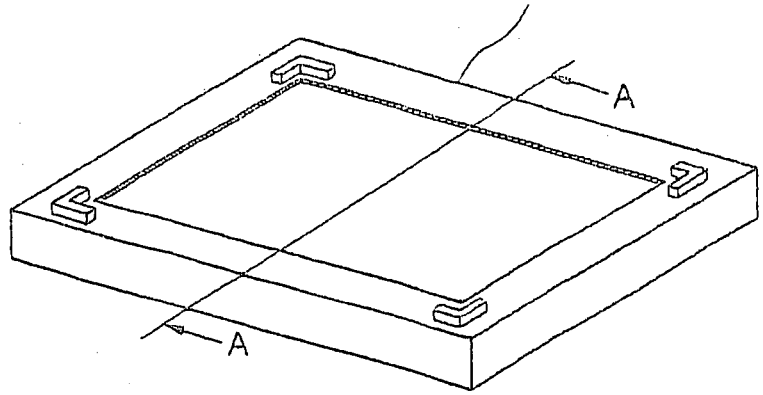
201 BACKLIGHT UNIT
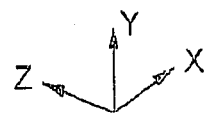

FIG. 14 PRIOR ART
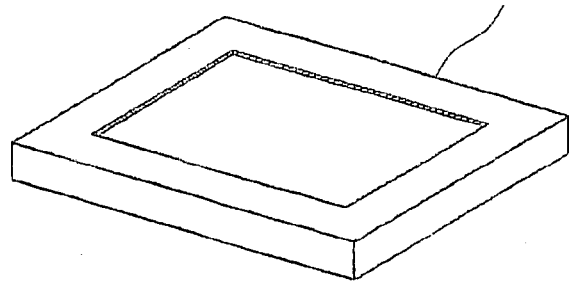
200a
203 SHIELD FRAME
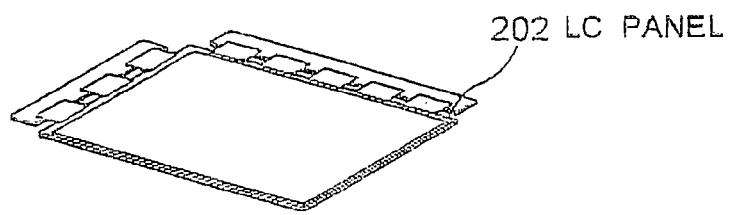
202 LC PANEL
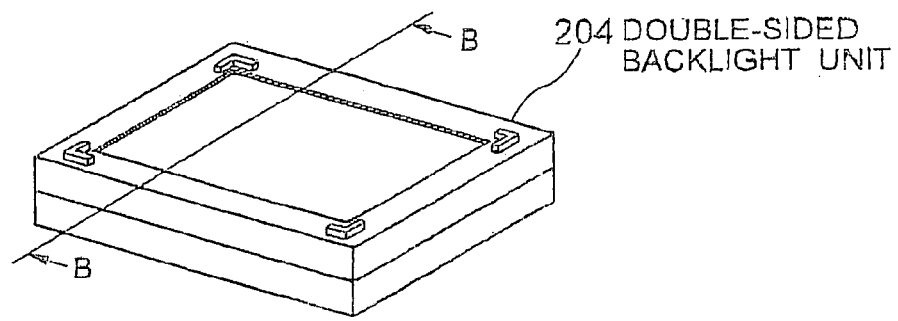
204 DOUBLE-SIDED BACKLIGHT UNIT
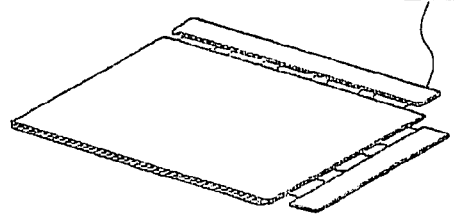
202 LC PANEL
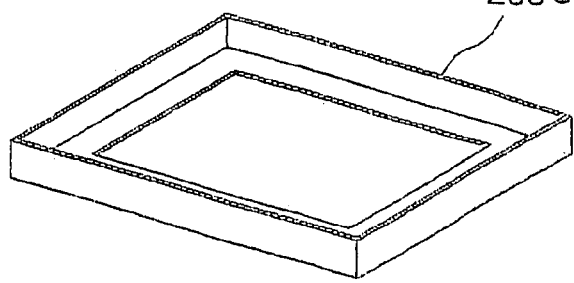
203 SHIELD FRAME

BACKLIGHT UNIT IN A LIQUID CRYSTAL DISPLAY DEVICE

BACKGROUND OF THE INVENTION

1. Field of the Invention

The present invention relates to a backlight unit for use in a liquid crystal display device, and more particularly, to a direct-irradiation type backlight unit in which a light source is disposed to oppose a light-emitting surface of the backlight unit.

The present invention also relates to a liquid crystal display device having such a backlight unit.

2. Description of Related Art

A backlight unit for use in a liquid crystal display (LCD) device is roughly classified into two types. One is a direct-irradiation type and the other an edge-light type having an optical guide plate. In the direct-irradiation type backlight unit, a plurality of light sources (lamps) are disposed to oppose a light-emitting surface of the backlight unit. A higher luminance can be easily obtained in the direct-irradiation type backlight unit as compared to the edge-light type backlight unit.

FIG. 10 is an exploded view showing the structure of an LCD device generally designated by numeral 200. A liquid crystal (LC) panel 202 of the LCD device 200 is sandwiched and held between a shield frame 203 and a backlight unit 201, and controls a transmission of the light emitted from the backlight unit 201 to thereby display images on the screen of the LC panel. FIG. 11 is an exploded view showing in detail the structure of the backlight unit shown in FIG. 10. FIG. 12 includes a sectional view showing a part of the backlight unit 201 taken along the line A—A of FIG. 10, and a graph showing the luminance distribution on a diffusion plate 216 of the backlight unit shown in the sectional view.

As shown in FIG. 11, the backlight unit 201 includes a backlight chassis 218 for defining the light-emitting surface of the backlight unit 201. Lamps 213 are disposed between a reflection plate 211 and the diffusion plate 216, and supported by a pair of lamp supporting members 215 in such a manner that the lamps 213 are spaced apart from each other at a predetermined interval. For example, the distance between the diffusion plate 216 and the center of the lamp 213 is set at about 10 to 17 mm; and the distance between each adjacent two of the lamps 213 is set at about 20 mm. One input terminal of the lamps 213 is grounded through a return cable 214. To the other input terminal is applied, by an inverter 219, a high alternating voltage of about 1000 to 1600 V at a peak, which is generally called a lighting start voltage. A larger length of the lamp 213 increases the lighting start voltage.

When the lamp 213 is disposed in an environment such as a dark state or low temperature state, the impedance of the lamp 213 is increased. It becomes, therefore, necessary to set the lighting start voltage higher than usual, assuming that the length of the lamp 213 is not changed. This leads to an increase in the size and cost of a power supply board, or inverter 219, for supplying the electric power to the lamp 213. When a conductive material is disposed in the vicinity of the lamp 213, an electrical discharge in the lamp 213 is induced by a leakage current 220 flowing between the lamp 213 and the conductive material. Thus, it becomes possible to lower the lighting start voltage even in the case of a dark state or low temperature state. For this reason, in the backlight unit 201, a metal is often used for the reflection plate 211.

The diffusion plate 216 has opposing edges supported by the lamp supporting member 215 and a central portion supported by a spacer 212 which is attached onto the reflection plate 211. The light emitted from the lamp 213 enters the diffusion plate 216 directly or by reflection from the reflection plate 211. The light incident onto the diffusion plate 216 then diffuses through an optical sheet assembly 217 such as including a diffusion sheet and a lens sheet, and exits the backlight unit 201.

In the backlight unit 201, the distance between the lamp 213 and the diffusion plate 216, and the angle of the light incident onto the diffusion plate 216 generally change depending on the position as viewed in the X-direction perpendicular to the extending direction of the lamp 213 in FIG. 11. Therefore, on the surface of the diffusion plate 216, the highest luminance is observed at the position right above the lamp 213, and the lowest luminance is observed at the position right above the intermediate position between each adjacent two of the lamps 213, as will be understood from the graph of FIG. 12. In this case, there arise a problem in that a luminance irregularity is observed on the light-emitting surface of the backlight unit 201. The backlight unit 201 also has the problem that the light, which is emitted from a lamp 213, travels in X-direction and illuminates the other two lamps 213 disposed adjacent to the former, are absorbed by the surfaces of the latter, resulting in a low luminance efficiency.

Patent Publications JP-A-4-275525 and -10-39808 describe an LCD device that can solve the above problems. FIG. 13 shows a sectional view of the backlight unit described in JP-A-4-275525, wherein the reflection plate 211 includes a convex portion 211M having a peak at the intermediate position between the adjacent two lamps 213. A reflection film having a mirror surface is formed on the convex portion 211M. With this configuration, the light emitted from the lamp 213 and traveling in the X-direction is reflected by the mirror surface of the reflection film formed on the convex portion 211M of the reflection plate and then travels in the direction toward the diffusion plate 216. This reduces the luminance irregularity observed on the light-emitting surface and thereby increases the luminance efficiency.

A double-sided display LCD device is known such as described, for example, in Patent Publication JP-A-2000-338483. The double-sided display LCD device has a display screen on the front side as well as on the rear side of the backlight unit. FIG. 14 is an exploded view showing the structure of the double-sided display LCD device. As shown in FIG. 14, the doublesided display LCD device 200a includes a liquid crystal (LC) panel 202 and a shield frame 203 on the front side (shown at the top in the drawing) as well as on the rear side (shown at the bottom in the drawing) of a double-sided backlight unit 204. The double-sided backlight unit 204 has a structure such as obtained by bonding the rear sides of two of the single-sided backlight units .

FIG. 15 is an exploded view showing the structure of the double-sided backlight unit described in JP-A-2000-338483. FIG. 16 is a sectional view showing a part of the backlight unit 204 and taken along the line B—B of FIG. 14. In this double-sided backlight unit 204, the diffusion plates 216 are disposed near both the front and rear sides of the backlight unit 204 to sandwich therebetween the lamps 213. Unlike the single-sided backlight unit shown in FIG. 12, the double-sided backlight unit 204 does not include the reflection plate 211 opposing the diffusion plate 216, allowing double-sided emission by a plurality of the lamps 213 arranged in a line.

As shown in FIG. 16, which shows the double-sided backlight unit 204 similarly to FIG. 12, the double-sided backlight unit 204 has a symmetric structure with respect to the center of the lamps 213 disposed at the center of the backlight unit.

As will be understood from the graph of FIG. 16, also in the double-sided backlight unit 204, the luminance efficiency is lower and the undesirable luminance irregularity is observed on the front- and rear-side diffusion plates 216 similarly to the single-sided backlight unit 201 having the cross section shown in FIG. 12. Further, as described above, the double-sided backlight unit 204 does not include the reflection plate unlike the single-sided backlight unit 201 that includes the reflection plate 211 disposed on the rear side of the lamp 21. Therefore, the technique used in JP-A-4-275525 cannot be applied to the double-sided backlight unit 204 for solving the above problems. Further, in the double-sided backlight unit, the absence of the reflection plate 211 made of a metal makes it impossible to lower the impedance of the lamp 213 and thereby to raise the lighting start voltage especially in the case of a dark state or low temperature state.

SUMMARY OF THE INVENTION

An object of the present invention is to provide a direct-irradiation type backlight unit capable of solving the above problems by reducing the luminance irregularity and increasing the luminance efficiency irrespective of whether the backlight unit is configured as a double-sided or single-sided unit. It is also an object of the present invention to provide a backlight unit in which the lighting start voltage can be lowered even when the backlight unit is disposed in a dark state or low temperature state during the operating time thereof.

Another object of the present invention is to provide an LCD device having the backlight unit of the present invention.

The present invention provides, in a first aspect thereof, a backlight unit including: an optical diffusion plate; at least one lamp disposed at a rear side of said optical diffusion plate; and an optical member for reflecting a light component of light emitted by said lamp substantially parallel to said optical diffusion plate, toward said optical diffusion plate.

The present invention provides, in a second aspect thereof, a backlight unit including: an optical diffusion plate; at least one elongate lamp disposed at a rear side of said optical diffusion plate; and an rod member extending parallel to said elongate lamp and made of a conductive material.

The backlight unit according to the first aspect of the present invention is capable of reducing the luminance irregularity observed on the light-emitting surface irrespective of whether the backlight unit is a double-sided emission type or single-sided emission type. Therefore, a suitable display quality can be realized in the LCD device having the backlight unit according to the first aspect of the present invention.

The LCD device having the backlight unit according to the second aspect of the present invention is capable of allowing the lamp to be turned on at a lower lighting start voltage even in the case of a dark state or low temperature state of the backlight unit, thereby reducing the cost of the lamp drive circuit of the backlight unit.

BRIEF DESCRIPTION OF THE DRAWINGS

FIG. 10 is an exploded view showing the structure of a typical LCD device;

FIG. 14 is an exploded view showing the structure of a typical double-sided display LCD device;

PREFERRED EMBODIMENTS OF THE INVENTION

Figure 1:
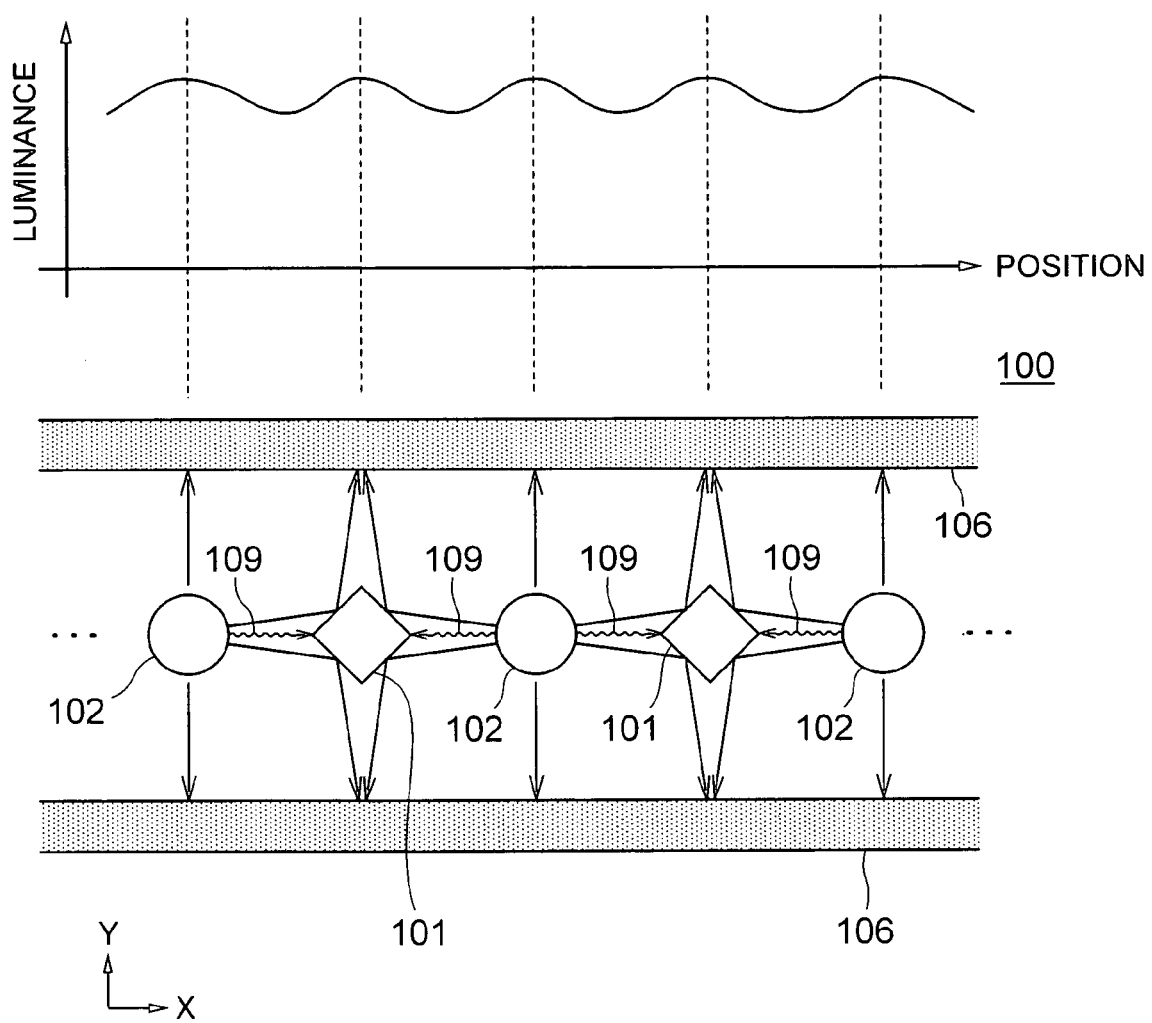
FIG. 1 is a sectional view of a part of the backlight unit according to a first embodiment of the present invention.
Figure 15:
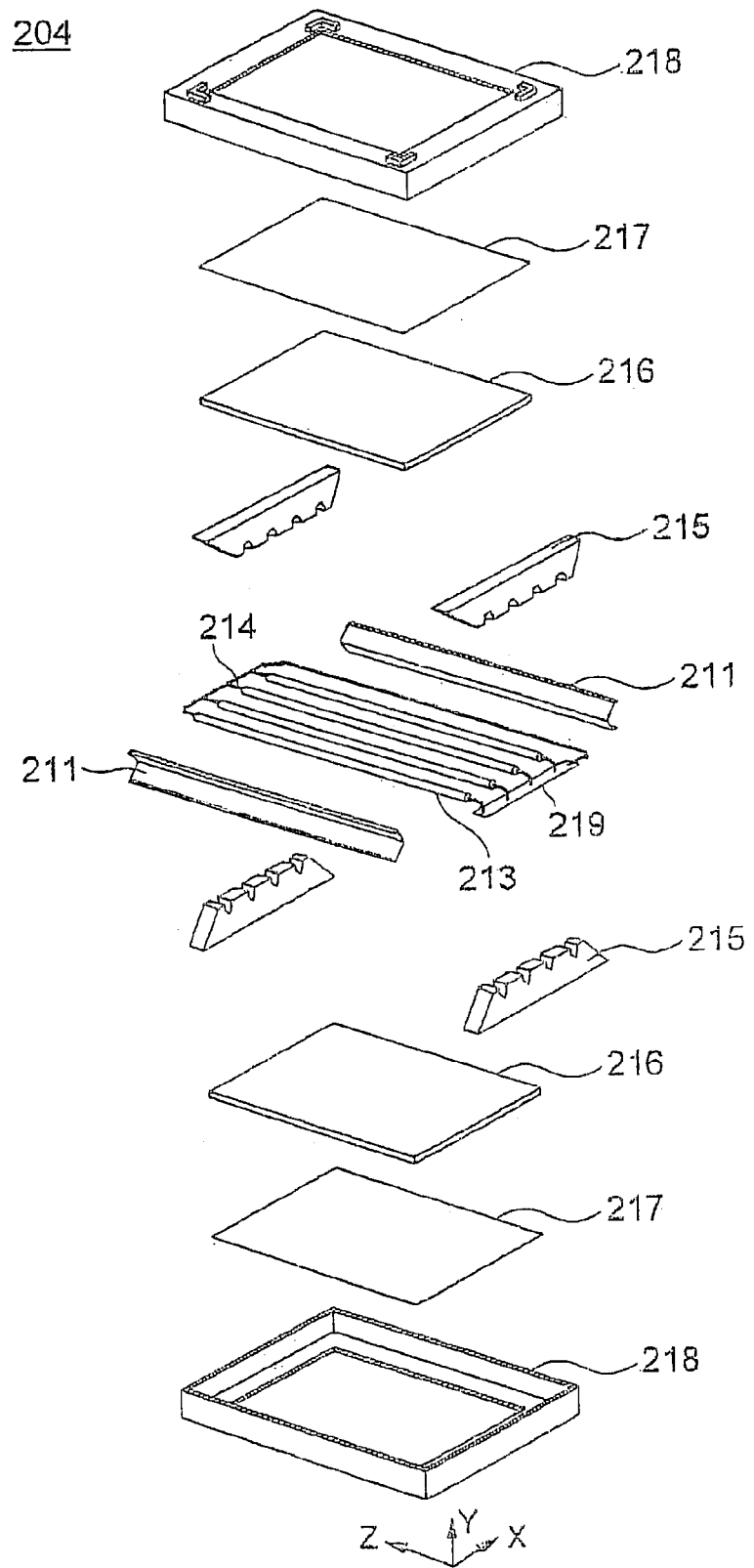
FIG. 15 is an exploded view showing the structure of the typical double-sided backlight unit.

The present invention will be now described in more detail based on preferred embodiments thereof with reference to the accompanying drawings. Referring to FIG. 1, there is shown a backlight unit according to a first embodiment of the present invention similarly to FIG. 12. The constituent elements of the backlight unit of the first embodiment are similar to those of the conventional double-sided backlight unit 204 shown in FIG. 15. More specifically, as shown in FIG. 15, the backlight unit of the first embodiment includes a pair of lamp supporting members 215, a pair of diffusion plates 216, a pair of optical sheet assemblies 217, and a pair of backlight chassises 218 near the front and back sides of the backlight unit thereof, as well as a pair of reflection plates 211 on the top and bottom edge thereof.

The sectional view shown in FIG. 1 corresponds to a part of the sectional view of the conventional double-sided backlight unit 204 taken along B—B line in FIG. 14. The double-sided backlight unit 100 of the present embodiment shown in FIG. 1 differs from the conventional double-sided backlight unit 204 in that a rod-like optical member 101 having a scatter-reflection function, i.e., scatter-reflection rod member, is disposed at the intermediate position between each adjacent two of the lamps 102.

The scatter-reflection rod members 101 are supported by a pair of lamp-supporting members as will be detailed later. The scatter-reflection rod member 101 may be formed of a metal or resin material having a scatter-reflection function.

Alternatively, the scatter-reflection rod member 101 may be formed of a metal, resin or ceramic material onto which a scatter-reflection sheet is bonded, or a metal, resin or ceramic material to which a scatter-reflection resin is applied by coating. The scatter-reflection rod member 101 has, for example, a rhomboid cross section having a symmetric shape with respect to a line passing the center thereof in X-direction, and another line passing the center thereof in Y-direction. By employing this structure, the scatter-reflected light is incident onto both the front-side and rear-side diffusion plates 106 similarly to one another.

The scatter-reflection rod member 101 is disposed such that the cross-sectional center thereof is set at the position that divides the line segment connecting the respective centers of the two adjacent lamps 102 equally. The adjacent two lamps 213 shown in FIG. 16 illuminate each other in the conventional double-sided backlight unit 204, whereas the scatter-reflection rod member 101 reflects and scatters the light emitted from the lamps 102 by the scatter-reflection surface thereof, with the result that the light travels in the direction toward the front- and back-side diffusion plates 106, in the double-sided backlight unit 100 of the first embodiment.

Figure 16:
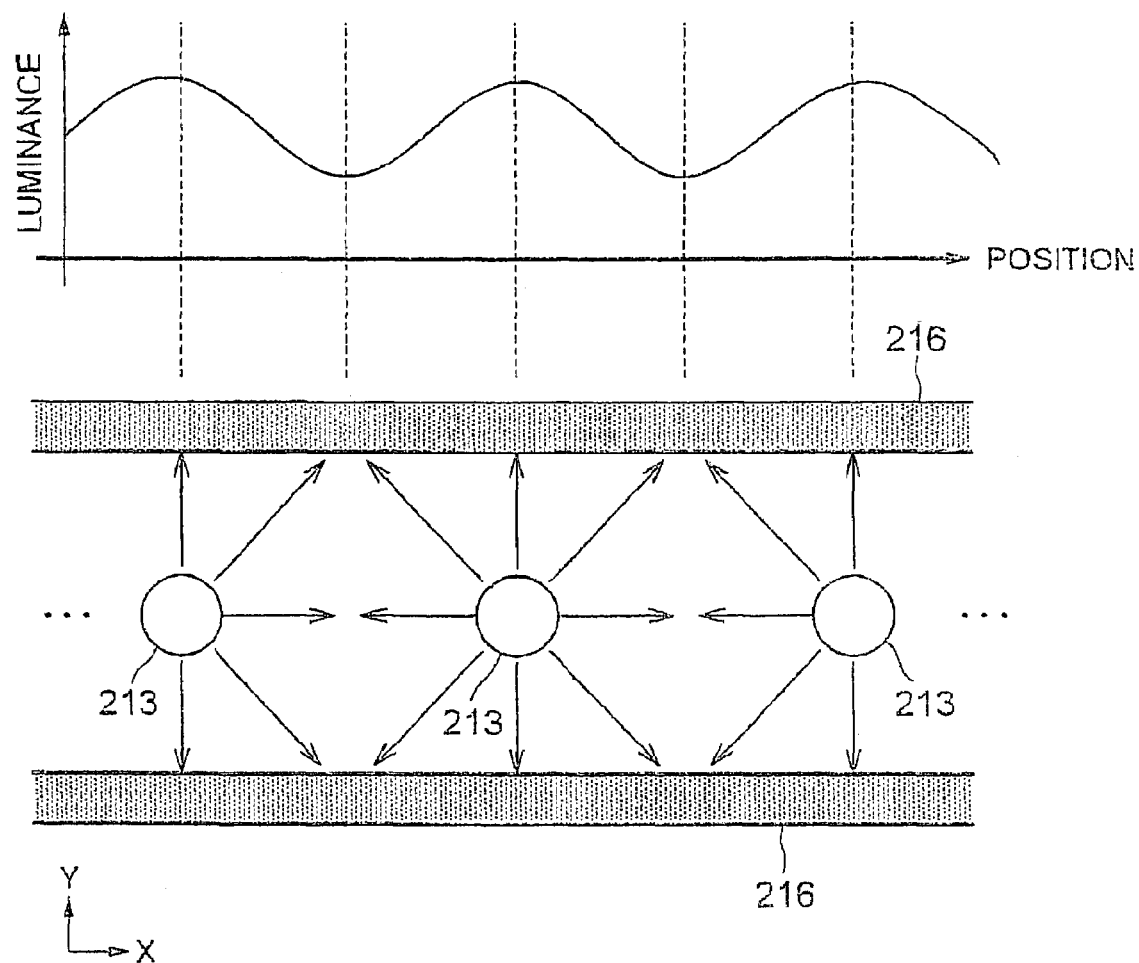
FIG. 16 is a sectional view showing a part of the section taken along the line B—B of FIG. 14.

As shown in the graph of FIG. 1, the observed luminance on the front- and rear-side diffusion plates 106 changes depending on the position in X-direction. More specifically, the highest luminance is observed at the position right above the center of the lamp 102 and that right above the center of the scatter-reflection rod member 101. This is because the cross-sectional shape of the scatter-reflection rod member 101 is defined such that many of the light beams that are reflected by the scatter-reflection rod member 101 travel in the direction toward the position on the diffusion plates 106 right above (or right under) the scatter-reflection rod member 101. As can be seen from the graph of FIG. 16 showing the luminance fluctuation observed on the front- and rear-side diffusion plates 106 in the conventional double-sided backlight unit 204, lower luminance is observed at the intermediate position between the adjacent two lamps. The lower luminance causes a larger luminance fluctuation on the diffusion plate 106. On the other hand, in the double-sided backlight unit 100 of the present embodiment, the lower luminance is not observed at the intermediate position between the adjacent two lamps 102, thereby reducing the luminance fluctuation as a whole.

According to the present embodiment, many of the light beams that are reflected by the scatter-reflection rod member 101 travel in the direction toward the position on the diffusion plates 106 right above (or right under) the scatter-reflection rod member 101. Therefore, the backlight unit of the present embodiment has a suitable function when acting as a double-sided backlight unit. Further, even in the case where the backlight unit does not include the reflection plate on the surface for opposing the diffusion plate 106, the luminance fluctuation depending on the position in X-direction on the diffusion plate 106 can be reduced, which in turn reduces the luminance irregularity. In the conventional double-sided backlight unit, it is generally not preferable to excessively reduce the distance between adjacent two of the lamps 102 in order to eliminate the luminance irregularity. This is because a large amount of heat is generated from the lamp 102. In addition, it causes an increase in the capacity of a drive circuit for the lamp 102, thereby resulting in an increase of the cost. In the double-sided backlight unit 100 of the present embodiment, provision of the scatter-reflection rod members reduces the luminance irregularity, and thereby increases the luminance efficiency.

In the conventional double-sided backlight unit 204 shown in FIG. 15, the reflection plate 211 made of a metal cannot be disposed on the rear side of the lamp 213, which results in a higher lighting start voltage. On the other hand, in the present embodiment, the scatter-reflection rod member 101 using a conductive material generates a parasitic capacitance between the scatter-reflection rod member 101 and the lamp 102, causing a small leakage current 109 to flow therebetween so as to induce an electrical discharge in the lamp 102. The lighting start voltage can thus be lowered.

It is therefore possible to cause the lamps 102 to be turned on at a lower lighting start voltage even in the case of a dark state or low temperature state of the backlight unit, thereby reducing cost of the lamp drive circuit of the backlight unit. The scatter-reflection rod member 101 can be used as the return cable for the lamps such as 214 shown in FIG. 15, reducing the cost for the cable. In this case, the scatter-reflection rod member 101 should be electrically grounded and connected to an input terminal of the lamp 102 for the lower-potential power source.

An LCD device having the double-sided backlight unit 100 of the present embodiment is obtained by disposing a pair of shield frames and a pair of liquid crystal panels on the front and back sides of the, double-sided backlight unit 100, similarly to the conventional double-sided display LCD device shown in FIG. 14. The double-sided display LCD device having such a doublesided backlight unit can be used for advertising purposes and the like.

Figure 2:
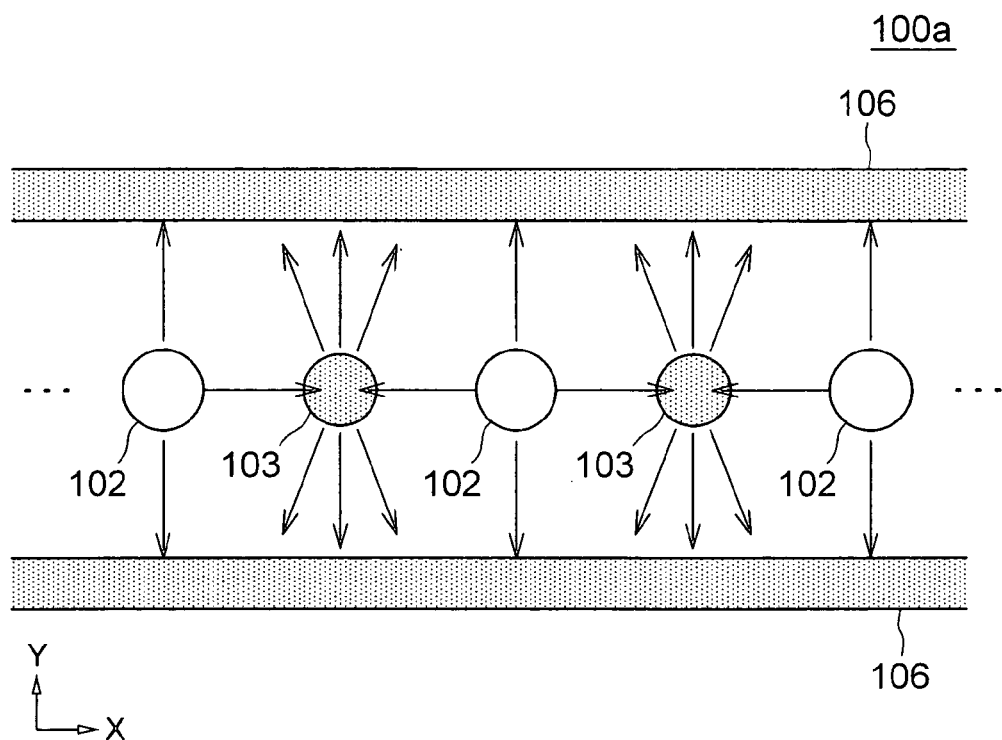
FIG. 2 is a sectional view of a part of the backlight unit according to a second embodiment of the present invention.

Referring to FIG. 2, there is shown a backlight unit according to a second embodiment of the present invention. The double-sided backlight unit 100a of the present embodiment differs from the double-sided backlight unit 100 of the first embodiment in that a rod-like diffusion member, i.e., diffusion rod member 103 is used as an optical member, in place of the scatter-reflection rod member 101 shown in FIG. 1. The diffusion rod member 103 changes at random the traveling direction of the light emitted from the lamp.

The diffusion rod member 103 has, for example, a round cross section having a symmetric shape with respect to a line passing the center thereof in X-direction, and another line passing the center thereof in Y-direction. The diffusion rod member 103 is obtained, for example, by dispersing particles or the like of a silicon, metal, or resin having a light scattering function in a transparent resin rode such as made of acrylic, PC, ABS, and PET. The light emitted from the lamp 102 and travels in X-direction is incident onto the diffusion rod member 103. Many of the light beams incident onto the diffusion rod member 103 then travel in the direction toward the diffusion plate 106.

The above configuration enables the double-sided backlight unit 100a of the present embodiment to increase the luminance efficiency and reduce the luminance irregularity observed on the top and bottom diffusion plates 106, as in the case of the first embodiment in which the scatter-reflection rod member 101 is used as an optical member. The diffusion rod member 103 apparently acts as a lamp that scatters light beams and is disposed such that the center thereof and center of the lamps 102 are aligned with each other. Thus, even when the diffusion plate 106 is viewed at different viewing angles, the luminance fluctuation observed on the diffusion plate 106 is reduced.

Figure 3:
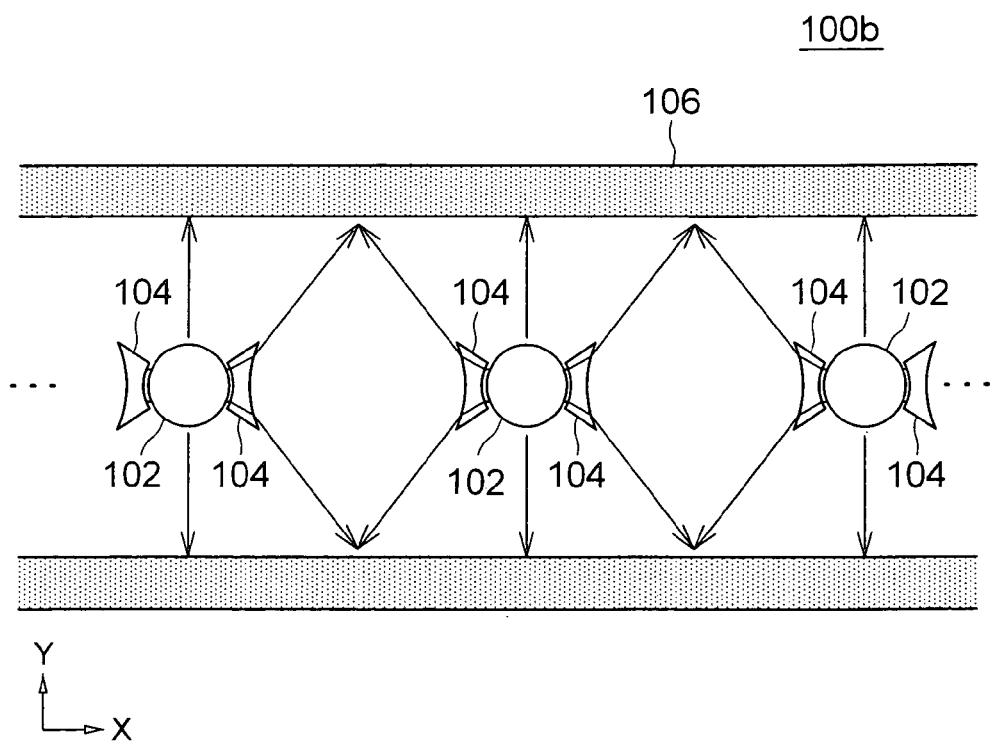
FIG. 3 is a sectional view of a part of the backlight unit according to a third embodiment of the present invention.

Referring to FIG. 3, there is shown a backlight unit according to a third embodiment of the present invention. The double-sided backlight unit 100b of the present embodiment differs from the double-sided backlight unit 100 of the first embodiment in that a rod-like prism member, i.e., a prism rod member 104 is disposed on both sides of the lamp 102 in X-direction as an optical member, in place of the scatter-reflection rod member 101 shown in FIG. 1. The prism rod member 104 is made of a transparent resin such as acrylic, PC, ABS, and PET, or glass. The prism rod member 104 has a light transmission function and changes the traveling direction of the incident light by refraction.

Figure 4:
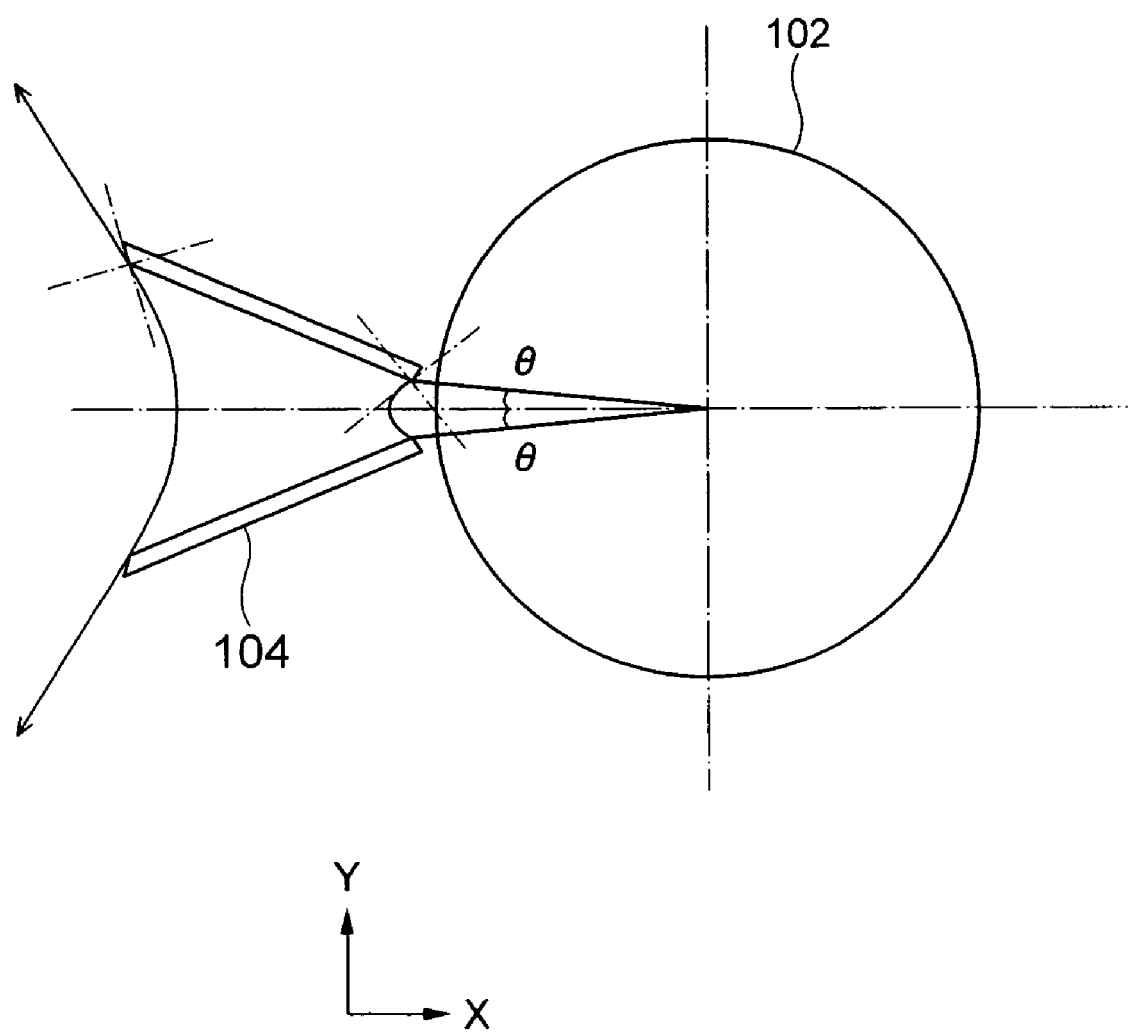
FIG. 4 is a sectional view showing the position in the vicinity of the lamp shown in FIG. 3 in an enlarged manner.

Referring to FIG. 4, there is shown the vicinity of the lamp 102 shown in FIG. 3 in an enlarged manner. The prism rod member 104 has, for example, a cross section similar to a concave lens for diffusing light beams and has a symmetric shape in Y-direction with respect to the line passing the center thereof. The prism rod member 104 receives the light beams in an angle between ±θ with respect to the lamp center among all the light beams emitted from the lamp 102, and then emits the light beams with each traveling direction thereof changed by refraction. It is to be noted that the light emitted from one of the lamps 213 and traveling in X-direction illuminates the adjacent lamps in the backlight unit shown FIG. 16. On the other hand, the light emitted from the lamp 102 and traveling in X-direction in the embodiment is directed toward the front- and rear-side diffusion plates 106 by the function of the prism rod member 104.

In the present embodiment, the luminance observed at the position on the diffusion plate 106 that corresponds to the intermediate position between adjacent two of the lamps 102 can be increased by appropriately adjusting the curvatures of both surfaces of the prism rod member 104, that is, the curvature of the surface receiving therethrough the light from the lamp 102 and the curvature of the surface emitting therefrom the light. As a result, the luminance efficiency can be increased and at the same time the luminance irregularity observed on the front- and rear-side diffusion plates 106 can be reduced, as in the case of the first embodiment.

Figure 5:
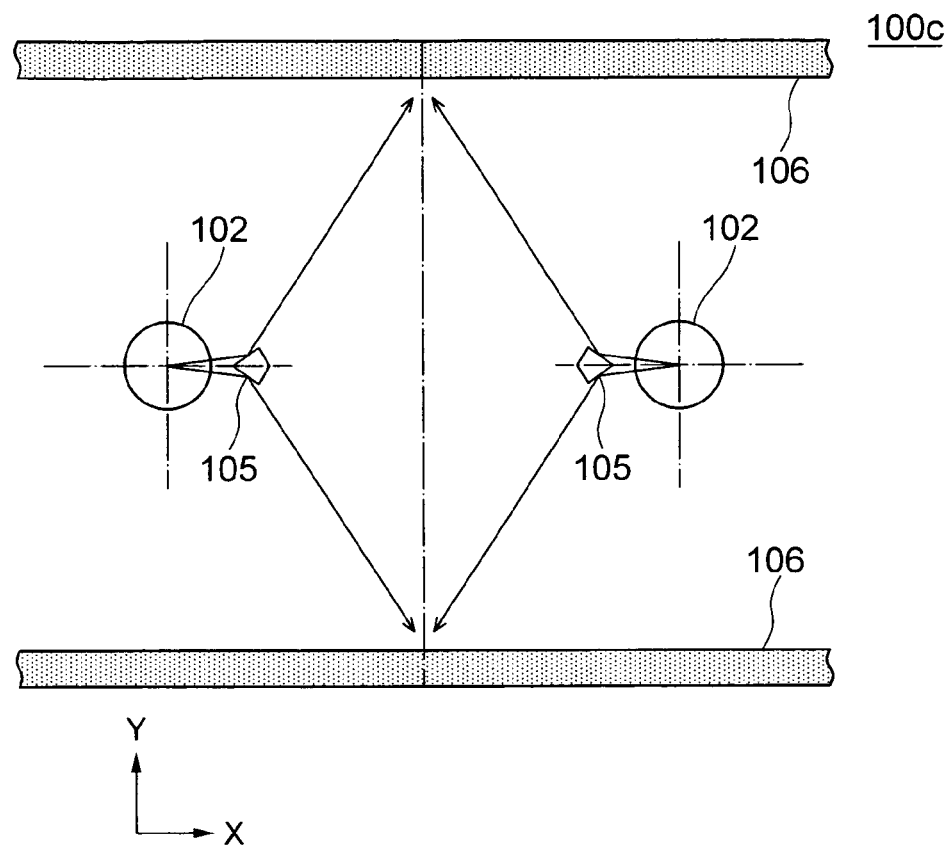
FIG. 5 is a sectional view of a part of the backlight unit according to a fourth embodiment of the present invention.

Referring to FIG. 5, there is shown a backlight unit according to a fourth embodiment of the present invention. The double-sided backlight unit 100c of the present embodiment differs from the double-sided backlight unit 100b of the third embodiment in that a rod-like reflecting member, i.e., a reflection rod member 105 having a light reflection function is used as an optical member, in place of the prism rod member 104 shown in FIG. 3. The reflection rod member 105 has a symmetric cross section in Y-direction with respect to the line passing the center thereof.

Figure 6:
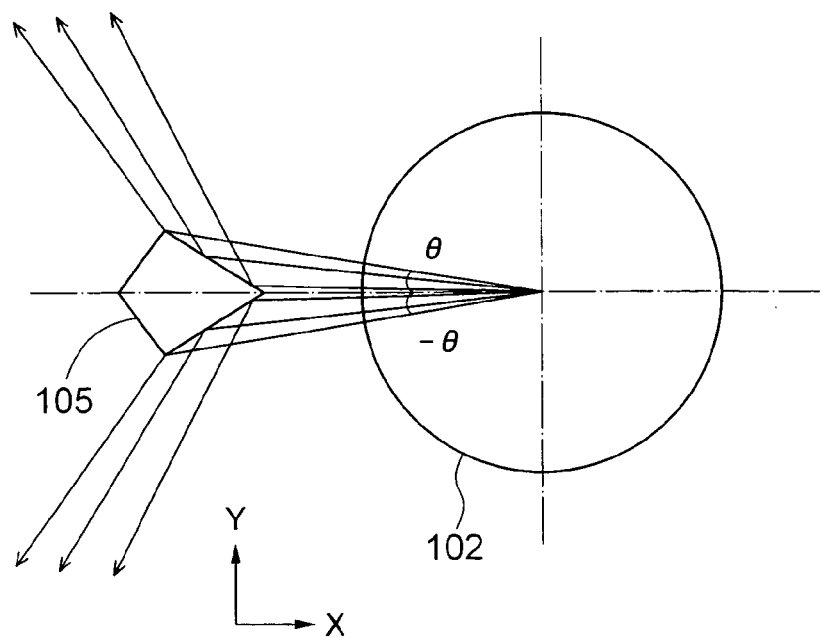
FIG. 6 is a sectional view showing the position in the vicinity of the lamp shown in FIG. 5 in an enlarged manner.

FIG. 6 shows the vicinity of the lamp 102 shown in FIG. 5 in an enlarged manner. As in the case of the third embodiment, the reflection rod member 105 is disposed on both sides of the lamp 102, to reflect the light beams emitted by the lamp within an angle ±θ shown in FIG. 6 with respect to the center of the lamp toward the diffusion plate 106. As a result, the luminance efficiency can be increased and at the same time the luminance irregularity observed on the front- and rear-side diffusion plates 106 can be reduced, as in the case of the third embodiment.

Figure 7:
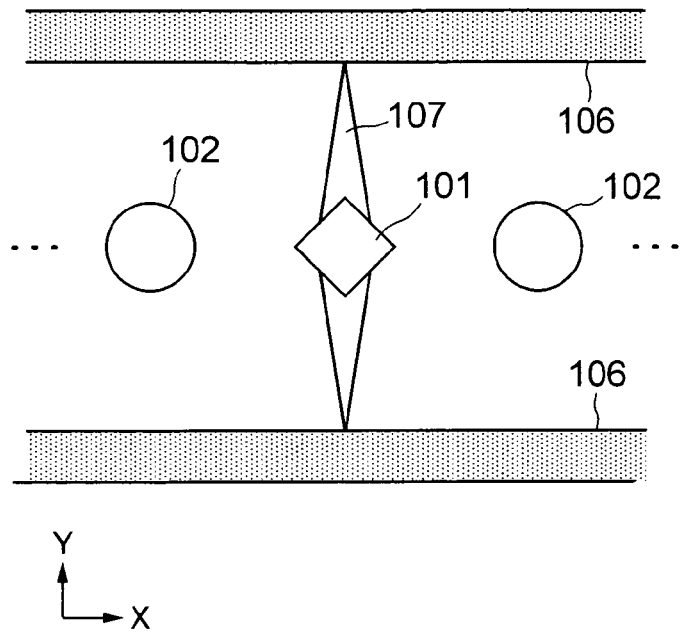
FIG. 7 is a sectional view of a part of the backlight unit according to a fifth embodiment of the present invention.
Figure 8:
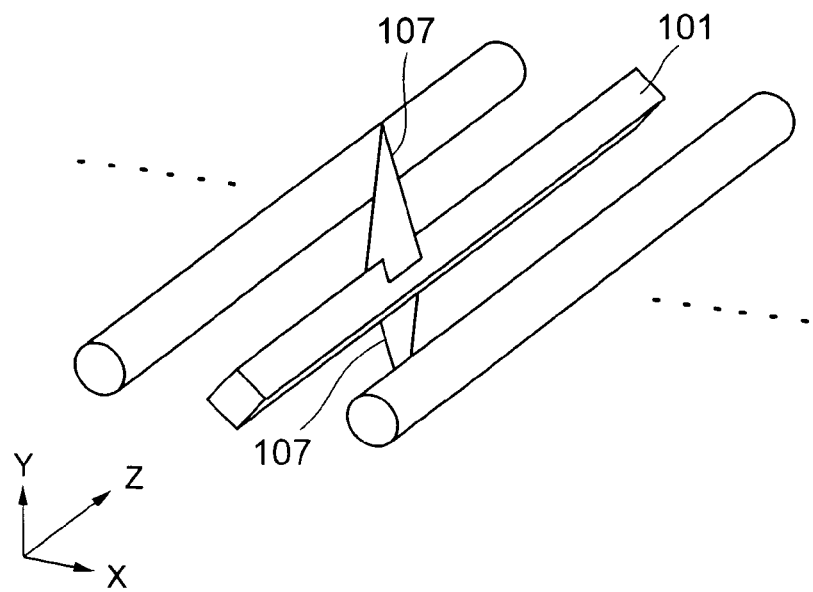
FIG. 8 is a perspective view showing a part of the backlight unit shown in FIG. 7.

Referring to FIG. 7, there is shown a backlight unit according to a fifth embodiment of the present invention. FIG. 8 shows a part of the backlight unit shown in FIG. 7. The double-sided backlight unit 100d of the present embodiment differs from the double-sided backlight unit 100 of the first embodiment in that a conical member 107 having a base fixed onto the scatter-reflection rod member 101 and an apex abutting on the diffusion plate. The conical member 107 is made of white ABS/PC having a light diffusing function and also acts as a spacer. Assuming that the backlight unit of the present embodiment is used in an LCD device with a screen size of 20 inches or so, it is sufficient to dispose a single conical member 107 at the position corresponding to the central position of each diffusion plate 106 in Z-direction.

Figure 11:
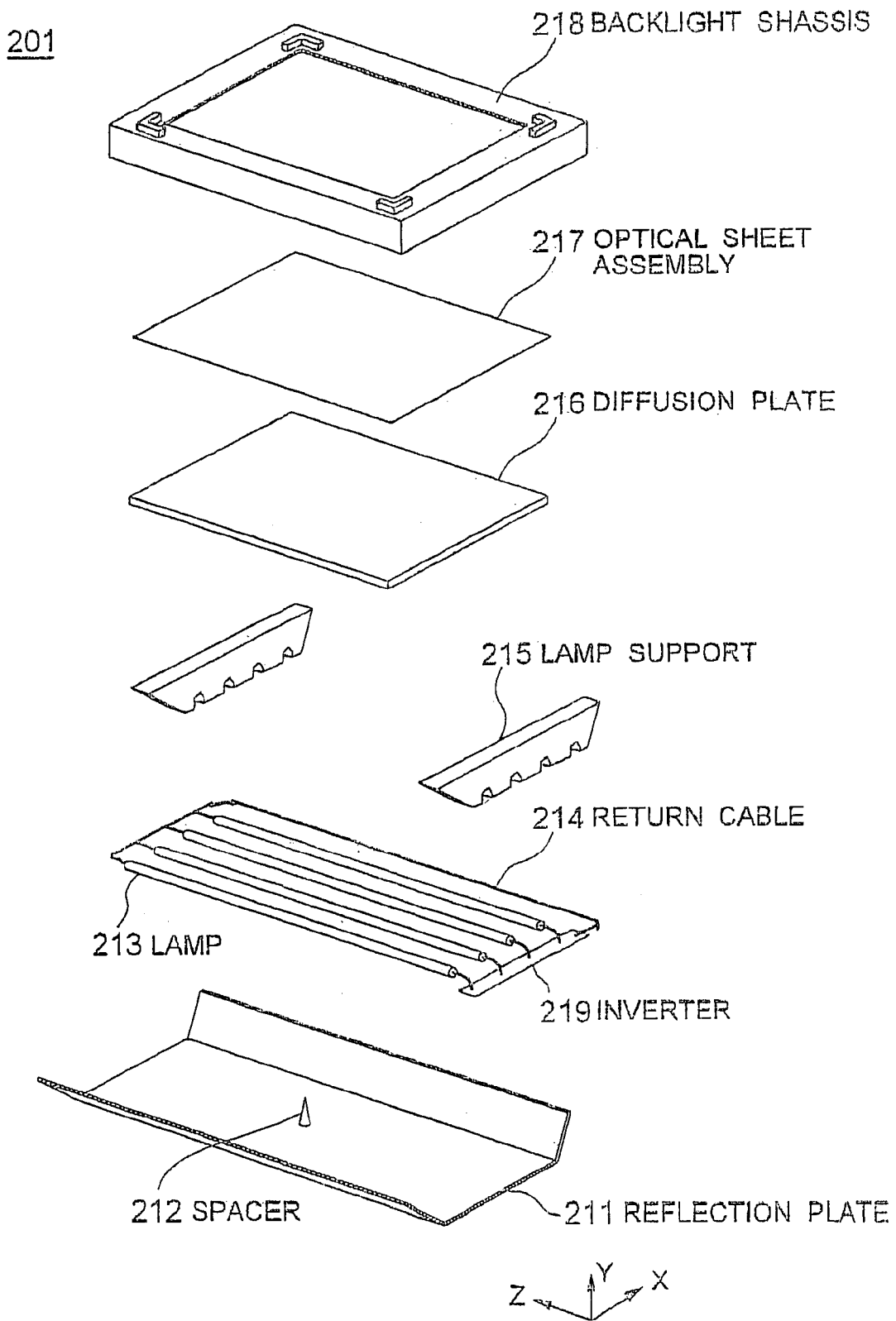
FIG. 11 is an exploded view showing in detail the structure of the general backlight unit shown in FIG. 10.

In the single-sided backlight unit shown in FIG. 11, a spacer 210 is formed on the reflection plate 211to prevent deformation or bending of the diffusion plate 216 due to the own weight or heat. In general, a larger light-emitting surface of the backlight causes a larger amount of bending in the diffusion plate 216. The conventional double-sided backlight unit 204 shown in FIG. 15, which does not include a reflection plate opposing the diffusion plate 216 due to the double-sided structure, has no spacer for supporting the diffusion plate 216, which is likely to bend. In the structure of the present embodiment, the conical member 107 supports the diffusion plate 216 and reduces the amount of bending in the diffusion plate even in the case of a larger light emitting surface. As a result, an excellent light emitting surface can be obtained.

Figure 12:
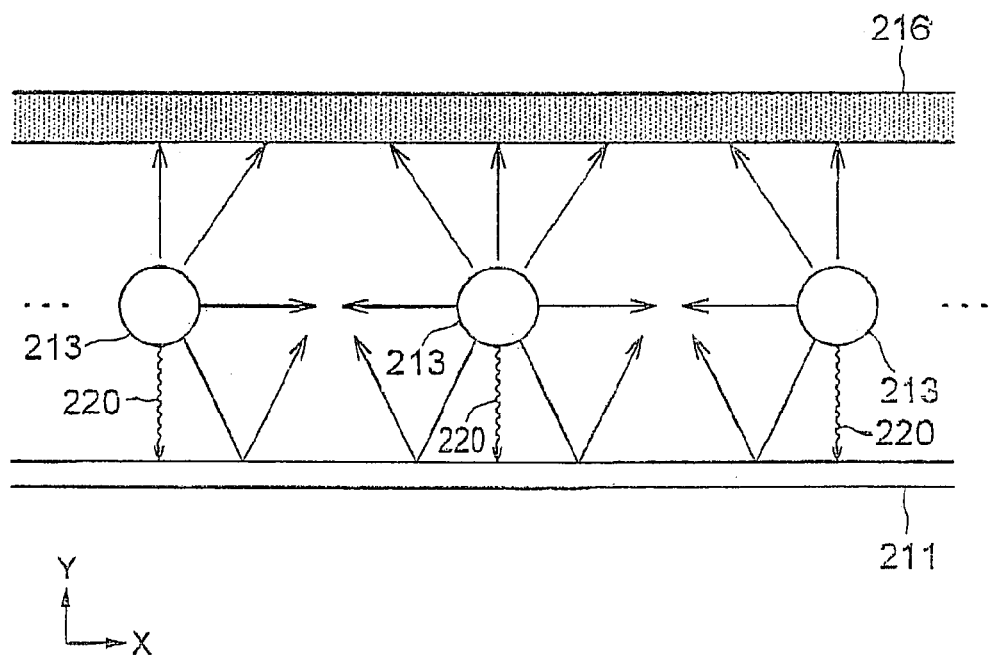
FIG. 12 is a cross sectional view showing a part of the cross section taken along the line A—A of FIG. 10.

In the foregoing embodiments, the backlight unit is configured as the double-sided backlight unit. However, the structure in which the optical member is disposed between adjacent two of the lamps 102 can be applied to a single-sided backlight unit such as shown in FIG. 12 as well.

Figure 9:
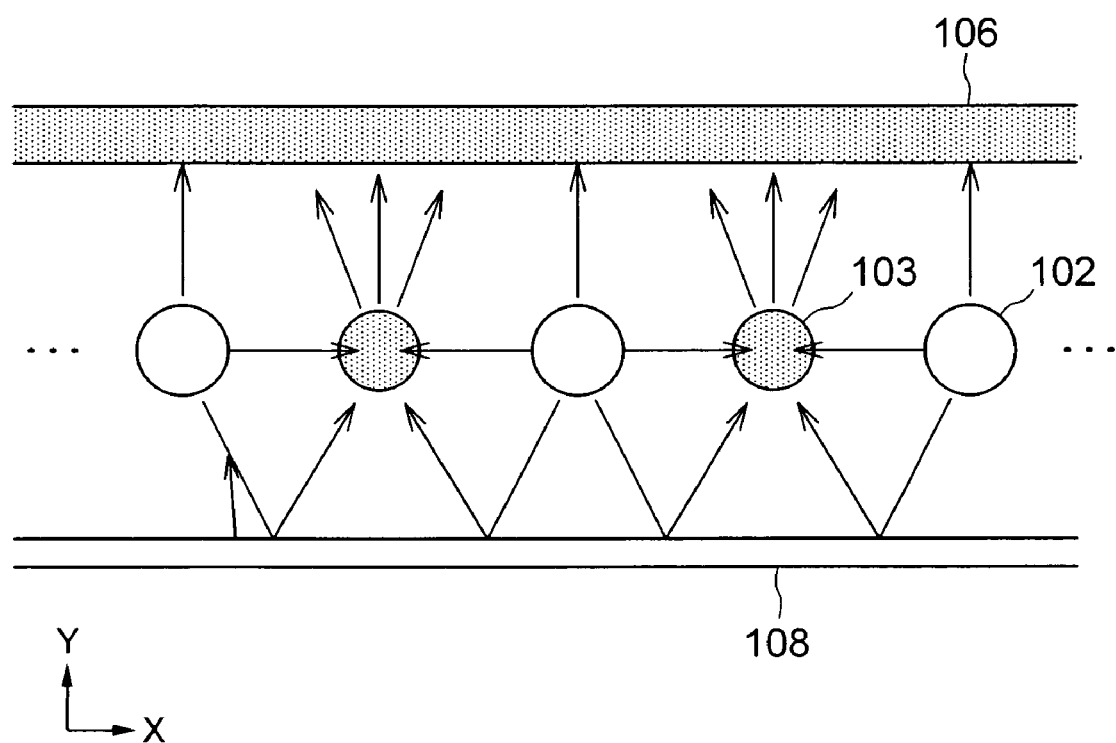
FIG. 9 is a sectional view showing the backlight unit in which a rod-like diffuse member is disposed, as an optical member, between adjacent two of the lamps.

Referring to FIG. 9, there is shown a single-sided backlight unit in which a diffusion rod member 103 is disposed between adjacent two of the lamps 102. In FIG. 9, the light that emitted by the lamp 102 and travelling in X-direction as well as the light emitted by the lamp and reflected by the reflection plate 108 is incident onto the diffusion rod member 103. Thus, even in the case of a single-sided backlight unit, the luminance efficiency can be increased and the luminance irregularity observed on the diffusion plate 106 can be reduced, similarly to the foregoing embodiments, by the structure of the present invention.

Figure 13:
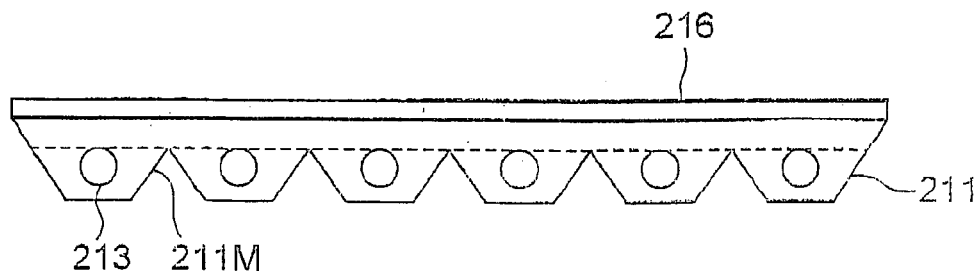
FIG. 13 is a sectional view showing the structure of a conventional backlight unit.

In the technique described in JP-A-4-275525 and shown in FIG. 13, the uniformity of the mirror surface 211M of the reflection plate 211 largely affects the luminance irregularity. Thus, the mirror surface requires a higher accuracy for the machining thereof. On the other hand, the optical member used in the present invention does not require a high accuracy for the machining etc. of the optical member due to a smaller constituent element in the present invention compared to the mirror surface of the reflection plate in the conventional backlight unit. That is, the present invention achieves improvement of the luminance efficiency and reduction of the luminance irregularity with ease compared to the conventional technique.

Further, in the technique described in JP-A-4-275525, the reflection plate 211 configured to surround each of the lamps 213 by a corresponding convex portion of the reflection plate 211 does not effectively reduce the luminance irregularity as observed from the front even in the case wherein the angles of the mirror surfaces 211M are adjusted one by one. On the other hand, the rod member used in the above embodiment apparently acts as a pseudo lamp for scatter-reflection of the light, causing less luminance irregularity as observed on the diffusion plate 106.

In the above embodiments, each of the optical rod members having a scatter-reflection function or lens function may be replaced by an optical member having a mirror surface, which also reduces the luminance irregularity. The rod member used in each of the embodiments may be made of a conductive material, which reduces the lighting start voltage due to a leakage current between the rod member and the lamp.

Each of the cross-sectional structures of the optical members described in the foregoing embodiments is only an example, and may be appropriately designed based on the distance between the optical member and the lamp 102 as well as between the centers of the optical member and diffusion plate 106. For example, if the distance between the lamp 102 and the front-side diffusion plate 106 differs from the distance between the lamp 102 and the rear-side side diffusion plate 106, the cross-sectional shape of the optical member may have an asymmetric shape in Y-direction, and have a cross-sectional shape corresponding to the respective distances.

The double-sided backlight unit in which the conical member is formed on the optical rod member for supporting the diffusion plate has been described in the fifth embodiment. A single-sided backlight unit may have a support member for supporting the diffusion plate between adjacent two of the lamps. The support member may be formed on another member other than the rod member.

Since the above embodiments are described only for examples, the present invention is not limited to the above embodiments and various modifications or alterations can be easily made therefrom by those skilled in the art without departing from the scope of the present invention.

What is claimed is:

1. A backlight unit comprising:
    an optical diffusion plate;
    a pair of lamp holders;
    a plurality of elongate lamps extending parallel to one another, said plural lamps being supported by said pair of lamp holders and being disposed at a rear side of said optical diffusion plate; and
    an optical rod member for reflecting a light component of light emitted by one of said plural lamps substantially parallel to said optical diffusion plate, toward said optical diffusion plate, said optical rod member extending parallel to said elongate lamps and being interposed between an adjacent two of said elongate lamps, said optical rod member being supported by said pair of lamp holders.

2. The backlight unit according to claim 1, wherein said optical rod member is made of a conductive material.

3. The backlight unit according to claim 1, wherein said optical rod member includes an extension extending from said rod member to abut said optical diffusion plate.

4. The backlight unit according to claim 1, wherein said optical rod member has a scatter-reflection surface for scatter-reflecting the light.

5. The backlight unit according to claim 1, wherein said optical rod member has a mirror surface for reflecting the light.

6. The backlight unit according to claim 1, wherein said optical rod member includes a transparent body and a scatter-reflection material dispersed in said transparent body.

7. The backlight unit according to claim 1, wherein said optical rod member is disposed at a substantially intermediate position between said adjacent two of said elongate lamps.

8. The backlight unit according to claim 1, wherein two of said optical rod member are disposed in respective vicinities of said adjacent two of said elongate lamps.

9. The backlight unit according to claim 1, wherein said optical rod member includes a prism member.

10. The backlight unit according to claim 1, wherein a pair of optical dispersion sheet are disposed to sandwich therebetween said elongate lamp and said optical member.

11. A backlight unit comprising:
    an optical diffusion plate;
    at least one elongate lamp disposed at a rear side of said optical diffusion plate;
    a rod member extending parallel to said elongate lamp and made of a conductive material; and
    a pair of lamp holders directly supporting said at least one lamp and said rod member.

12. The backlight unit according to claim 11, wherein said rod member is electrically grounded.

13. The backlight unit according to claim 11, wherein said rod member is electrically connected to one of terminals of said elongate lamp.

14. The backlight unit according to claim 11, wherein a pair of said optical dispersion sheets sandwich therebetween said elongate lamp and said rod member.

15. A liquid crystal display device comprising:
    the backlight unit according to claim 1; and
    a liquid crystal panel adjacent said backlight unit.

16. A liquid crystal display device comprising:
    the backlight unit according to claim 11; and
    a liquid crystal panel adjacent said backlight unit.

17. The backlight unit as claimed in claim 1, wherein said plural lamps and said optical rod member are structured and arranged so that a single plane that is parallel to a longitudinal axis of said plural lamps bisects each of said plural lamps and said optical rod member into respective substantially symmetrical halves.

18. The backlight unit as claimed in claim 11, wherein said at least one lamp and said rod member are structured and arranged so that a single plane that is parallel to a longitudinal axis of said at least one lamp bisects said at least one lamp and said rod member into respective substantially symmetrical halves.

19. A backlight unit, comprising:
    an optical diffusion plate;
    a pair of lamp holders;
    a plurality of elongate lamps extending parallel to one another and being disposed at a rear side of said optical diffusion plate, respective ends of each of said plural lamps being directly supported by said pair of lamp holders; and
    an elongate optical member extending parallel to said plural lamps and being interposed between an adjacent two of said plural lamps, said optical member being directly supported by said pair of lamp holders.

* * * * *